United States Patent [19]

Ueyama

[11] Patent Number: 5,284,884

[45] Date of Patent: Feb. 8, 1994

[54] ANTISTATIC RESIN-FORMING COMPOSITION AND PROTECTIVE LAYER OF OPTICAL RECORDING MEDIUM

[75] Inventor: Kenichi Ueyama, Ichikaimachi, Japan

[73] Assignee: Kao Corporation, Tokyo, Japan

[21] Appl. No.: 897,116

[22] Filed: Jun. 11, 1992

[30] Foreign Application Priority Data

Jun. 14, 1991 [JP] Japan .................................. 3-143132
Jun. 14, 1991 [JP] Japan .................................. 3-143133

[51] Int. Cl.⁵ .............................................. C08F 2/46
[52] U.S. Cl. ................................................. 522/100
[58] Field of Search ........................................ 522/100

[56] References Cited

FOREIGN PATENT DOCUMENTS 3-49053 1/1991 Japan .

Primary Examiner—John Kight, III
Assistant Examiner—T. Mosley
Attorney, Agent, or Firm—Lowe, Price, LeBlanc & Becker

[57] ABSTRACT

An antistatic resin composition comprised of (A) a radiation-curable acrylic, methacrylic or epoxy compound having an —(OR)m— chain and (B) a minor amount of a quaternary ammonium salt of the formula (1):

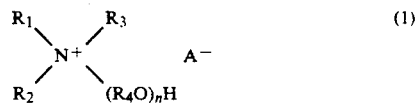

wherein R and $R_4$ are an alkylene group of 1 to 3 carbon atoms, $R_1$, $R_2$ and $R_3$ independently represent an alkyl or alkenyl group having up to 20 carbon atoms, or an acryloyl or methacryloyl group, n is an integer of at least 4, and $A^-$ is a counter ion. The antistatic resin-forming composition is useful, for example, for a protective layer of an optical recording medium, which is formed on the light incident side of a substrate of the optical recording medium.

26 Claims, No Drawings

ANTISTATIC RESIN-FORMING COMPOSITION AND PROTECTIVE LAYER OF OPTICAL RECORDING MEDIUM

BACKGROUND OF THE INVENTION (1) Field of the Invention

This invention relates to an antistatic resin-forming composition, and an application thereof.

This resin-forming composition is useful for various shaped articles, which include, for example, a protective layer of an optical recording medium.

(2) Description of the Related Art

Optical recording mediums include a writing type optical disc and an optical disc of the type for the exclusive use of reproduction. Substrates of these optical discs are made of inorganic glass or organic resins such as an acrylic resin and a polycarbonate resin. These materials are electrically insulating and readily electrically charged, and therefore, dust is readily collected on the substrate with the result of an erroneous reading of the recording mediums.

To impart an electrostatic property to the substrate, an attempt has been made wherein an antistatic agent is coated on the surface of the substrate upon which light is incident (Japanese Unexamined Patent Publication No. H3-49053). More specifically, a resin composition comprised of the same resin as that of the substrate and 2 to 10% by weight, preferably 3 to 6% by weight, based on the resin of an antistatic agent is coated as a protective layer on the substrate.

The conventional protective layer containing an antistatic agent has, however, a problem such that, when the amount of the antistatic agent added is increased to enhance the antistatic effect, the protective layer becomes undesirably pliable, and in contrast, when the amount of the antistatic agent is reduced to enhance the hardness of the protective layer, the antistatic effect is reduced. The conventional protective layer has another problem such that it exhibits an antistatic effect to a considerable extent under high humid conditions, i.e., at a relative humidity of 50% or higher, but only to a slight extent under low humid conditions, i.e., at a relative humidity lower than 50%.

SUMMARY OF THE INVENTION

In view of the foregoing, a primary object of the present invention is to provide an antistatic resin-forming composition capable of providing a cured resin product which exhibits a good antistatic effect even under low humid conditions and has an acceptable hardness.

Another object of the present present invention is to provide a protective layer of an optical recording medium, which layer exhibits a good antistatic effect even under low humid conditions and has an acceptable hardness.

In one aspect of the present invention, there is provided an antistatic resin-forming composition comprising (A) at least one radiation-curable compound which has at least one group selected from the group consisting of an acryloyl group, a methacryloyl group and an epoxy group and which further has an $-(OR)_m-$ chain in the molecule (wherein R represents an alkylene group having 1 to 3 carbon than 10 parts by weight, per 100 parts by weight of the radiation-curable compound, of a quaternary ammonium salt represented by the following formula (1):

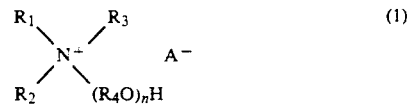

wherein $R_1$, $R_2$ and $R_3$ independently represent an alkyl group having 1 to 20 carbon atoms, an alkenyl group having 2 to 20 carbon atoms, an acryloyl group or a methacryloyl group, $R_4$ represents an alkylene group having 1 to 3 carbon atoms, and n is an integer of at least 4, and $A^-$ is a counter ion.

In another aspect of the present invention, there is provided a protective layer of an optical recording medium, which is a cured product of the above-mentioned antistatic resin-forming composition.

DESCRIPTION OF THE PREFERRED EMBODIMENTS

The antistatic resin-forming composition of the present invention is comprised of at least one radiation-curable compound and a quaternary ammonium salt of the formula (1). The radiation-curable compound has at least one acryloyl, methacryloyl or epoxy group and an $-(OR)_m-$ chain, wherein R is an alkylene group having 1 to 3 carbon atoms, i.e., a methylene, ethylene, propylene or trimethylene group, and m is an integer of at least 4. The acrylic, methacrylic or epoxy resin possessing the $-(OR)_m-$ chain formed from the resin-forming composition of the present invention has a good water absorption and a reduced insulating property, and thus, exhibits an enhanced antistatic property.

The acrylic or methacrylic compound having the $-(OR)_m-$ chain preferably includes an acrylic or methacrylic monomer represented by the following formula (2):

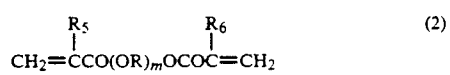

wherein R represents an alkylene group having 1 to 3 carbon atoms, preferably an ethylene group; m is an integer of at least 4, preferably 6 to 23, and $R_5$ and $R_6$ independently represent a hydrogen atom or a methyl group.

In the resin-forming composition of the present invention, compounds copolymerizable with the above-mentioned acrylic, methacrylic or epoxy compound having the $-(OR)_m-$ chain can be incorporated. The copolymerizable compound is selected from acrylic, methacrylic and epoxy monomers which do not have the $-(OR)_m-$ chain, or other copolymerizable monomers which do not have the $-(OR)_m-$ chain. As the copolymerizable compounds, polyfunctional acrylates or methacrylates which do not have the $-(OR)_m-$ chain are preferably used for providing a cured resin product having an enhanced hardness. As the polyfunctional acrylates and methacrylates, there can be mentioned, for example, trimethylolpropane triacrylate, trimethylolpropane trimethacrylate, pentaerythritol triacrylate, pentaerythritol trimethacrylate, pentaerythritol tetraacrylate, pentaerythritol tetramethacryalte, dipentaerythritol pentaacrylate, dipentaerythritol pentamethacrylate, dipentaerythritol hexaacrylate, dipentaerythritol hexamethacrylate, neopentyl glycol acrylate, neopentyl glycol methacrylate, bisphenol A acrylate, bisphenol A methacrylate, polyurethane-modified acrylate, polyurethane-modified methacrylate, polyester-modified acrylate and polyester-modified methacrylate.

If desired, a copolymerizable compound having a function of a diluent can be incorporated. Such a compound includes, for example, monofunctional acrylate or methacrylate such as 2-hydroxyethyl acrylate, 2-hydroxyethyl methacrylate, 2-ethylhexyl acrylate, 2-ethylhexyl methacrylate. By incorporating a monofunctional acrylate or methacrylate in the resin-forming composition, the viscosity of the composition can be desirably lowered to a value lower than 200 cp, i.e., to an extent such that the composition is suitable for coating on a substrate by a spin-coating method for making an optical recording medium.

The amount of the copolymerizable compound is preferably smaller than 1,000 parts by weight, more preferably 100 to 200 parts by weight, per 100 parts by weight of the acrylic, methacrylic or epoxy compound having the $-(OR)_m-$ chain.

Among the quaternary ammonium salts of the formula (1), those in which each of $R_1$, $R_2$ and $R_3$ have at least 16 carbon atoms are preferable because of an enhanced compatibility with the radiation-curable compounds. More preferable quaternary ammonium salts are those in which at least one of $R_1$, $R_2$ and $R_3$ is an acryloyl or methacryloyl group because the resulting cured resin product has a permanent antistatic property. Further, $R_4$ in the formula (1) is preferably an ethylene group, namely, the group $-(R_4O)_nH$ is $-(CH_2CH_2O)_nH$ wherein n is an integer of at least 4, more preferably 6 to 30.

The counter ion $A^-$ is not particularly limited and includes a chlorine ion and others. A counter ion represented by the following formula (3) is especially preferable because, when the resin-forming composition is used for a protective layer of an optical recording medium, the counter ion of the formula (3) deteriorates the recording layer and substrate of the optical recording medium only to a negligible extent.

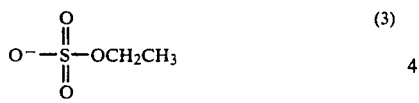

The amount of the quaternary ammonium salt to be incorporated with the radiation-curable compounds is not larger than 10 parts by weight, preferably 0.5 to 2 parts by weight, per 100 parts by weight of the total amount of the radiation-curable acrylic, methacrylic or epoxy compound having the $-(OR)_m-$ chain and the optional copolymerizable compound not having the $-(OR)_m-$ chain.

Usually a photopolymerization initiator such as an ultraviolet-sensitive polymerization initiator, or other curing agents are incorporated in the antistatic resin-forming composition of the present invention.

The antistatic resin-forming composition of the present invention can be used in various fields. A typical example of the uses thereof is a protective layer of an optical recording medium.

An optical recording medium fundamentally has a laminate structure such that a recording layer, a substrate and a protective layer are superposed upon another in this order. When the optical recording medium is used, light is incident upon the exposed surface of the protective layer and is transmitted through the three layers. The protective layer is preferably formed by coating the substrate with the resin-forming composition of the present invention by, for example, a spin-coating method, and then, curing the coated layer. The substrate is usually made of an acrylic resin, a polycarbonate resin or other ordinarily used resin.

The invention will now be described by the following examples that by no means limit the scope of the invention. In the examples, parts are by weight.

EXAMPLE 1

A resin-forming composition was prepared by mixing together 100 parts of trimethylolpropane triacrylate, 50 parts of $CH_2=CHCO(OCH_2)_{14}OCOCH=CH_2$, 1.5 parts of a quaternary ammonium salt represented by the following formula (4):

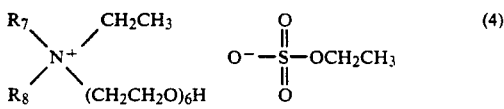

wherein $R_7$ and $R_8$ represent an alkyl group having $C_{16}$ to $C_{18}$ carbon atoms, and 7.5 parts of a photopolymerization initiator ("Irg. 500" supplied by Ciba-Geigy Japan Ltd.). The resin-forming composition was heated to about 45° C. whereby the quaternary ammonium salt was dissolved to prepare a coating solution for a protective layer of an optical recording medium.

The coating solution was coated on the light incident side of a polycarbonate substrate by a spin-coating method to form a coated layer having a thickness of about 5 μm. The coated layer was cured by irradiating it with ultraviolet rays by using a UV lamp (H bulb) supplied by Fusion Co. to prepare an optical disc having a transparent protective layer. The irradiation dose was 2,400 mJ/cm².

EXAMPLE 2

An optical disc was made by the same procedure as that employed in Example 1 wherein 100 parts of $CH_2=CHCO(OCH_2CH_2)_9OCOCH=CH_2$ was used instead of 50 parts of $CH_2=CHCO(OCH_2CH_2)_{14}OCOCH=CH_2$ with all other conditions remaining substantially the same.

COMPARATIVE EXAMPLE 1

An optical disc was made by the same procedure as that employed in Example 1 wherein the protective layer was prepared from a composition composed of 100 parts of trimethylolpropane triacrylate, 1.0 parts of the quaternary ammonium salt of the formula (4) and 5.0 parts of the same photopolymerization initiator as that used in Example 1 with all other conditions remaining substantially the same.

COMPARATIVE EXAMPLE 2

An optical disc was made by the same procedure as that employed in Example 1 wherein the protective layer was prepared from a composition composed of 100 parts of trimethylolpropane triacrylate, 5.0 parts of the quaternary ammonium salt of the formula (4) and 5.0 parts of the same photopolymerization initiator as that used in Example 1 with all other conditions remaining substantially the same.

(1) Evaluation of Surface Resistivity and Hardness

Surface resistivity at 30% RH and 50% RH and pencil hardness of the optical discs made in Examples 1 through 4 were evaluated at 23° C. The pencil hardness test was carried out on the protective layer-coated polycarbonate substrate. The results are shown in Table 1.

TABLE 1

| Sample | Surface resistivity[*1] at 30% RH | at 50% RH | Pencil hardness |
|---|---|---|---|
| Example 1 | $1.1 \times 10^{12}$ | $3.8 \times 10^{11}$ | 2H |
| Example 2 | $1.5 \times 10^{12}$ | $5.5 \times 10^{11}$ | 2H |
| Comp. Ex. 1 | Larger than $10^{15}$ | $5.5 \times 10^{15}$ | 2H |
| Comp. Ex. 2 | $8.5 \times 10^{12}$ | $1.1 \times 10^{12}$ | H |

[*1]ohm/unit area

As seen from Table 1, samples of Examples 1 and 2 exhibit a low surface resistivity of $1.1$–$1.5 \times 10^{12}$ ohm and a hardness of 2H. In contrast, sample of Comparative Example 1 exhibits a large surface resistivity although this sample contains 1 part of the quaternary ammonium salt. Sample of Comparative Example 2 containing a large amount (5 parts) of the quaternary ammonium salt exhibits an antistatic effect but has a poor hardness.

(2) Evaluation of Error Ratio

The percentage of errors caused by dust collection due to static electrification of samples of Examples 1 and 2 and Comparative Example 1 was determined as follows. The initial bite error ratios were first measured. The surface of each sample was wiped by a wiping cloth ("Savina Minimax" supplied by Kanebo Ltd.) at 24° C. and 30% RH, and then the surface was dirtied by a dirt chamber method (ASTM D-2741-68). Immediately thereafter, the bite error ratios were measured. The bite error ratios of samples of Examples 1 and 2 as measured after dirting were several times as large as those of the initial bite error ratios. In contrast, the bite error ratios of sample of Comparative Example 1 as measured after dirting were several hundreds or several thousands times as large as those of the initial bite error ratios. When each sample was again wiped by the wiping cloth in the same manner as mentioned above, the bite error ratios approximately returned to the initial values.

What is claimed is:

1. An antistatic resin-forming composition comprising (A) a radiation-curable compound which has at least one group selected from the group consisting of an acryloyl group, a methacryloyl group and an epoxy group and which further has an —(OR)$_m$— chain in the molecule, wherein R represents an alkylene group having 1 to 3 carbon atoms and m is an integer of at least 4, and (B) not larger than 10 parts by weight, per 100 parts by weight of the radiation-curable compound, of a quaternary ammonium salt represented by the following formula (1):

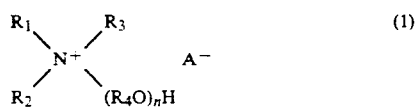

wherein $R_1$, $R_2$ and $R_3$ independently represent an alkyl group having 1 to 20 carbon atoms, an alkenyl group having 2 to 20 carbon atoms, an acryloyl group or a methacryloyl group, $R_4$ represents an alkylene group having 1 to 3 carbon atoms, n is an integer of at least 4, and $A^-$ is a counter ion.

2. An antistatic resin-forming composition according to claim 1, wherein the radiation-curable compound having the —(OR)$_m$— chain is represented by the following formula (2):

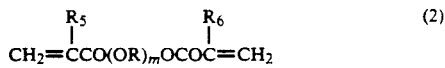

wherein R represents an alkylene group having 1 to 3 carbon atoms, m is an integer of at least 4, and $R_5$ and $R_6$ independently represent a hydrogen atom or a methyl group.

3. An antistatic resin-forming composition according to claim 2, wherein R is an ethylene group and m is an integer of 6 to 23.

4. An antistatic resin-forming composition according to claim 1, which further comprises at least one compound which is copolymerizable with the radiation-curable compound and does not have the —(OR)$_m$— chain in the molecule.

5. An antistatic resin-forming composition according to claim 4, wherein the copolymerizable compound is a polyfunctional acrylate or methacrylate.

6. An antistatic resin-forming composition according to claim 4, wherein the copolymerizable compound is a monofunctional acrylate or methacrylate.

7. An antistatic resin-forming composition according to claim 4, wherein the amount of the copolymerizable compound is smaller than 1,000 parts by weight per 100 parts by weight of the radiation-curable compound having the —(OR)$_m$— chain.

8. An antistatic resin-forming composition according to claim 4, wherein the amount of the copolymerizable compound is 100 to 200 parts by weight per 100 parts by weight of the radiation-curable compound having the —(OR)$_m$— chain.

9. An antistatic resin-forming composition according to claim 4, wherein the amount of the quaternary ammonium salt of the formula (1) is 0.5 to 2 parts by weight per 100 parts by weight of the sum of the radiation-curable compound having the —(OR)$_m$— chain and the copolymerizable compound.

10. An antistatic resin-forming composition according to claim 1, wherein each of $R_1$, $R_2$ and $R_3$ in the formula (1) is an alkyl or alkenyl group having at least 16 carbon atoms.

11. An antistatic resin-forming composition according to claim 10, wherein at least one of $R_1$, $R_2$ and $R_3$ in the formula (1) is an acryloyl or methacryloyl group.

12. An antistatic resin-forming composition according to claim 1, wherein $R_4$ in the formula (1) is an ethylene group and n is an integer of 6 to 30.

13. An antistatic resin-forming composition according to claim 1, wherein the counter ion $A^-$ is represented by the following formula (3):

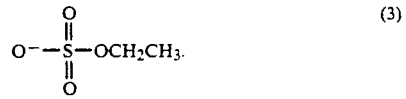

14. A protective layer of an optical recording medium, which is comprised of a cured product of an antistatic resin-forming composition comprising (A) a radiation-curable compound which has at least one group selected from the group consisting of an acryloyl group, a methacryloyl group and an epoxy group and which further has an —(OR)$_m$— chain in the molecule, wherein R represents an alkylene group having 1 to 3 carbon atoms and m is an integer of at least 4, and (B) not larger than 10 parts by weight, per 100 parts by weight of the radiation-curable compound, of a quaternary ammonium salt represented by the following formula (1):

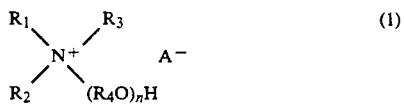

wherein $R_1$, $R_2$ and $R_3$ independently represent an alkyl group having 1 to 20 carbon atoms, an alkenyl group having 2 to 20 carbon atoms, an acryloyl group or a methacryloyl group, $R_4$ represents an alkylene group having 1 to 3 carbon atoms, n is an integer of at least 4, and $A^-$ is a counter ion.

15. The protective layer according to claim 14, wherein the radiation-curable compound having the —(OR)$_m$— chain is represented by the following formula (2):

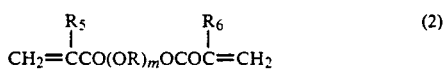

wherein R represents an alkylene group having 1 to 3 carbon atoms, m is an integer of at least 4, and $R_5$ and $R_6$ independently represent a hydrogen atom or a methyl group.

16. The protective layer according to claim 14, wherein R is an ethylene group and m is an integer of 6 to 23.

17. The protective layer according to claim 14, wherein the antistatic resin-forming composition further comprises at least one compound which is copolymerizable with the radiation-curable compound and does not have the —(OR)$_m$— chain in the molecule.

18. The protective layer according to claim 17, wherein the copolymerizable compound is a polyfunctional acrylate or methacrylate.

19. The protective layer according to claim 17, wherein the copolymerizable compound is a monofunctional acrylate or methacrylate.

20. The protective layer according to claim 17, wherein the amount of the copolymerizable compound is smaller than 1,000 parts by weight per 100 parts by weight of the radiation-curable compound having the —(OR)$_m$— chain.

21. The protective layer according to claim 17, wherein the amount of the copolymerizable compound is 100 to 200 parts by weight per 100 parts by weight of the radiation-curable compound having the —(OR)$_m$— chain.

22. The protective layer according to claim 17, wherein the amount of the quaternary ammonium salt of the formula (1) is 0.5 to 2 parts by weight per 100 parts by weight of the sum of the radiation-curable compound having the —(OR)$_m$— chain and the copolymerizable compound.

23. The protective layer according to claim 14, wherein each of $R_1$, $R_2$ and $R_3$ in the formula (1) is an alkyl or alkenyl group having at least 16 carbon atoms.

24. The protective layer according to claim 23, wherein at least one of $R_1$, $R_2$ and $R_3$ in the formula (1) is an acryloyl or methacryloyl group.

25. The protective layer according to claim 14, wherein $R_4$ in the formula (1) is an ethylene group and n is an integer of 6 to 30.

26. The protective layer according to claim 14, wherein the counter ion $A^-$ is represented by the following formula (3):

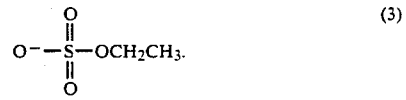

* * * * *